Sept. 2, 1941.        R. H. BLANK        2,254,990
AUTOMATIC SAFETY VALVE FOR HYDRAULIC BRAKES
Filed July 17, 1939
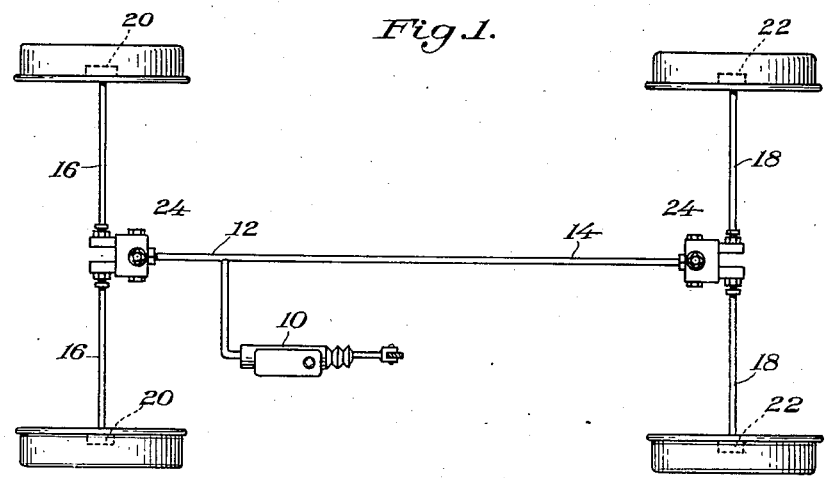
*Fig.1.*
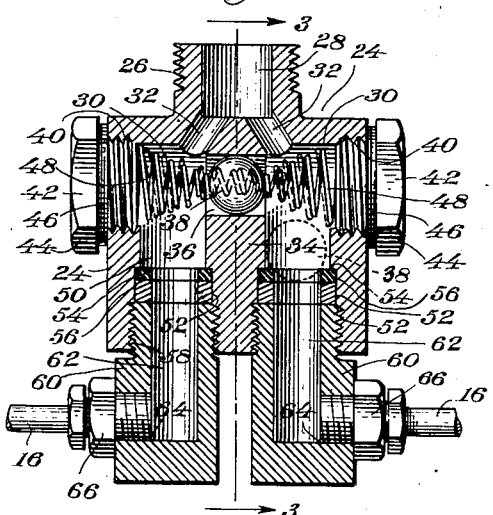
*Fig.2.*
*Fig.3.*
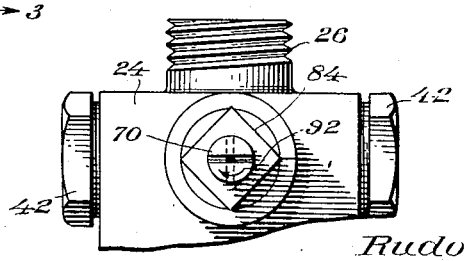
*Fig.4.*
Rudolph H. Blank,
INVENTOR
BY Victor J. Evans & Co.
ATTORNEYS
WITNESS Patented Sept. 2, 1941

2,254,990

UNITED STATES PATENT OFFICE 2,254,990

AUTOMATIC SAFETY VALVE FOR HYDRAULIC BRAKES

Rudolph H. Blank, Treadwell, N. Y.

Application July 17, 1939, Serial No. 284,959

9 Claims. (Cl. 303—84)

My invention relates to automotive vehicles, and has among its objects and advantages the provision of an improved automatic safety valve for hydraulic brakes.

In hydraulically operated braking systems it frequently happens that a break in a fluid line or a gravity leak will result in such loss of pressure when the brakes are applied as to render the system inoperative in a dangerous degree. Should a leak occur between the master cylinder and any one of the four-wheel brakes, substantially the entire system is drained of its operating fluid. Such leaks, in addition to rendering the entire brake system inoperative, result in a waste of fluid.

Accordingly, an object of my invention is to provide a safety valve mechanism for a hydraulically operated system functioning to insure that although a leak should occur in one portion of the brake system, other portions of the system will be unaffected and remain operative to provide a corresponding portion of the original braking power for maintaining control of the vehicle. The automatic safety valve is designed for incorporation in conventional braking systems without necessitating alteration of the system.

In the accompanying drawing:

Figure 1 is a diagrammatic view of a conventional hydraulically operated braking system illustrating my invention applied thereto;

Figure 2 is a sectional view of the automatic safety valve;

Figure 3 is a sectional view along the line 3—3 of Figure 2; and

Figure 4 is a fragmentary detail view.

In the embodiment selected to illustrate my invention, my invention is incorporated in hydraulically operated braking systems including a liquid displacement means such as the pedal operated master cylinder 10 from which the liquid lines 12 and 14 lead to similar lines 16 and 18, respectively. Lines 16 and 18 lead to the front and rear wheel brake cylinders 20 and 22, respectively. According to Figure 1, I illustrate one of the automatic safety valve units 24 as operatively connecting the fluid line 12 with the fluid lines 16, and the second unit 24 as operatively connecting line 14 with the two lines 18. Since the units 24 are identical in construction and operation, the description of one will apply to both.

Referring to Figure 2, the automatic safety valve unit 24 comprises a body 24 provided with a threaded neck 26 for connection with line 12, as an example. Neck 26 is bored at 28, which bore has communication with chambers 30 through the medium of bores 32. Chambers 30 are separated by a partition 34, but have communication through the medium of a bore 36 within which I mount a ball valve 38.

Body 24 is provided with threaded openings 40 for the reception of plugs 42 between the heads of which and the faces 44 I interpose retaining washers 46. Bores 40 have communication with the chambers 30, while the inner ends of the plugs 42 constitute mounts for the bases of conically shaped compression springs 48, the apexes of which engage the ball valve 38 for normally and yieldingly holding the valve in the position illustrated in Figure 2.

I provide the body 24 with bores 50 which have communication with the chambers 30 and are counterbored at 52 to provide ledges 54 against which I position resilient valve seats 56 of material such as rubber. Counterbores 52 are threaded at 58 for connection with connections 60 for the fluid lines 16. The inner ends of the connections 60 have pressure relation with the valve seats 56, and the connections are bored at 62 to have communication with the bores 50. Connections 60 are provided with threaded bores 64 for connection with pipe fittings 66 for connecting the lines 16 with the unit. It will thus be seen that the lines 16 have communication with the chambers 30, and that the latter have communication with the line 12 through the medium of the large bore 28 and the smaller bores 32.

Under normal conditions, the pressures in the chambers 30 are equal so that the ball valve 38 will remain in the normal position of Figure 2. With no pressure effective in the chambers 30, the ball 38 will remain at rest in its normal position because of the springs 48 which function as stabilizers. These springs have sufficient tension to support the ball in its normal position against vibrations incident to travel of the vehicle. The cross sectional area of the bore or inlet 28 exceeds the total combined cross sectional area of the bores 32, and the individual cross sectional areas of the bores 32 are less than the cross sectional area of the line 12 supplying fluid to the inlet bore 28. Therefore, the liquid in the source of supply, the supplying line and the inlet bore 28 become reservoirs of liquid and pressure. Bores 62 are of larger cross sectional area than the bores 32.

Should a break or leakage occur in the liquid circuit beyond the valve unit 24, as for example in one of the lines 16 and its associated mechanism, such defects will cause a pressure reduction which brings the safety valve unit into play. In other words, reduction of pressure in one of the lines 16 and its associated mechanism will be effective back to the bore 32 associated with that line. Thus the pressures on opposite sides of the ball valve 38 will become unbalanced, that is, the pressure on the intact side of the system will be greater on that side of the ball valve than on the opposite side. The cross sectional area of the bore 62 on the leak side of the system is larger than its associated bore 32, which provides an outlet passage capable of distributing a larger volume of liquid than can be supplied through the smaller bore. This feature also aids in building up the pressure on the unbroken side of the liquid circuit, which together with the velocity of the fluid in the broken side of the circuit, creates a partial vacuum or pull on that side of the ball valve. These forces combined would move the ball valve 38 from its normal position of Figure 2 against the effective spring tension thereon for dropping the ball upon the valve seat 56 associated with the leak side of the circuit. Figure 5 illustrates the ball valve 38 in such a position. The unseated ball valve 38 would then stop further passage of brake fluid into the leak side of the circuit, but automatically maintaining the other portion of the system in normal operating condition. Therefore, the unit 24 operates to automatically cut out further delivery of brake fluid to a defective circuit, but operates to permit the other circuits to operate under normal conditions, thus permitting operation of the remaining brakes so as to prevent complete brake impairment.

The springs 48 of Fig. 2 are of very low expansion pressure, not capable of holding the ball 38 in a suspended position. Their purpose being only to prevent the ball from being dislodged by vibration from its position in the bore 36. It will be noted that the point of contact is very small which would prevent it from being held in a suspended position and also prevent the spring from following the ball down. Fully expanded, the springs 48 barely touch each other, so that when the ball gets near the edge of the bore 36, the spring on the unbroken side would not be in contact with the ball. This alone overcomes the possibility of the ball being held in a suspended position. As the ball 38 takes a position at rest on the valve seat 56 of Fig. 2, as indicated in dotted lines, the adjacent spring 48 will have engagement with the ball so as to hold it upon the seat, thus preventing loss of brake liquid through seepage past the valve, as when the hydraulic pressure on the valve has been released. Fig. 2 illustrates elongation of the springs 48 in dotted lines.

I provide means for positively holding the ball valve 38 in its normal position in the bore 36, as when bleeding of the system is necessary. To this end, the stem 70 is provided with a transverse groove 72 at its inner end, which groove has a curvature conforming to the ball valve 38. Figure 3 illustrates the stem 70 in its normal position, at which time the axis of the curvature of the groove 72 parallels the axis of the bore 36, so that the ball valve may move laterally of the partition 34 in either direction. Upon rotation of the stem 70 ninety degrees, the axis of the curvature of the groove 72 is positioned at right angles to the bore 36 so that the flanges 74 will restrain the ball valve from lateral shifting. Thus the groove 72 will house the ball so as to prevent relative movement inside the bore 36.

Stem 70 is provided with a flange 76 which lies in a recess 78 in the body 24, and the body is provided with a boss 80 internally threaded at 82 for the reception of a plug 84 bored at 86 to receive the stem 70. Packing 88 is housed between the plug 84 and the flange 76. I provide the stem 70 with a slot 90 in its outer end, which slot is normally arranged in axial alignment with a mark 92 on the boss 80 for indicating the normal position of the stem. Thus the slot 90 provides accommodation for a tool such as a screw driver in addition to providing an indication for ascertaining correct adjustment of the stem. Packing 88 will be compressed between the plug 84 and the flange 76 so that the flange will be restrained from rotary motion, thus preventing accidental shifting of the stem.

Without further elaboration, the foregoing will so fully illustrate my invention that others may, by applying current knowledge, readily adapt the same for use under various conditions of service.

I claim:

1. In a hydraulically operated braking system of the type wherein liquid lines connect a master cylinder with a plurality of braking cylinders, a valve unit having a brake fluid inlet connection with the master cylinder and individual brake fluid outlets communicating with said lines, valve seats associated with the fluid outlets, a valve element support located above said valve seats, a valve element normally carried by said support, and yielding means for supporting the valve element in its normal position on said support, said yielding means and said valve element being responsive to variable pressures in the fluid outlets to permit said valve element to move off said support and drop onto the valve seat associated with the low pressure side of the valve unit.

2. In a hydraulically operated braking system of the type wherein liquid lines connect a master cylinder with a plurality of braking cylinders, a valve unit having a brake fluid inlet connection with the master cylinder and individual brake fluid outlets communicating with said lines, valve seats in said fluid outlets, and valve means normally balanced between the fluid outlets above said valve seats, said valve means being responsive to variable pressures in the fluid outlets to drop upon the valve seat associated with the low pressure fluid outlet.

3. In a hydraulically operated braking system of the type wherein liquid lines connect a master cylinder with a plurality of braking cylinders, a valve unit having a brake fluid inlet connection with the master cylinder and individual brake fluid outlets communicating with said lines, valve seats in the fluid outlets, a ball valve support located above said valve seats, a ball valve normally balanced on said support, opposed yielding means for supporting the ball valve in its normal position, said opposed yielding means and said ball valve being responsive to variable pressures in said fluid outlets to permit the ball valve to drop onto the valve seat associated with the low pressure fluid outlet.

4. In a hydraulically operated braking system of the type wherein liquid lines connect a master cylinder with a plurality of braking cylinders, a valve unit having a brake fluid inlet connection with the master cylinder and individual brake fluid outlets communicating with said lines, a partition in the valve unit having a bore communicating with the fluid outlets, valve seats associated with the fluid outlets beneath said bore, a ball valve normally balanced in said bore, and opposed springs for supporting the ball valve in its normal position, said opposed springs and said ball valve being responsive to variable pressures on opposite sides of the partition to permit the ball valve to move out of the bore and drop onto the valve seat associated with the low pressure fluid outlet.

5. In a hydraulically operated braking system of the type wherein liquid lines connect a master cylinder with a plurality of braking cylinders, a valve unit having a brake fluid inlet connection with the master cylinder and individual brake fluid outlets communicating with said lines, valve seats associated with the fluid outlets, a valve element support located above said valve seats, a valve element normally balanced on said support, yielding means for supporting the valve element in its normal position, said yielding means and said valve element being responsive to variable pressures in the fluid outlets to permit the valve element to move off said support and drop onto the valve seat associated with the low pressure side of the valve unit, and means for fixedly securing the valve element in its normally balanced position.

6. In a hydraulically operated braking system of the type wherein liquid lines connect a master cylinder with a plurality of braking cylinders, a valve unit having a brake fluid inlet connection with the master cylinder and individual brake fluid outlets communicating with said lines, valve seats associated with the fluid outlets, a normally balanced valve element arranged in unseating relation with said valve seats, and yielding means for supporting the valve element in its normal position, said yielding means and said valve element being responsive to variable pressures in the fluid outlets for moving the valve element into seating relation with the valve seat associated with the low pressure side of the valve unit, said yielding means being so arranged as to hold the valve element against either valve seat when seated thereon.

7. In a hydraulically operated braking system of the type wherein liquid lines connect a master cylinder with a plurality of braking cylinders, a valve unit having a brake fluid inlet connection with the master cylinder and individual brake fluid outlets communicating with said lines, valve seats in the fluid outlets, a normally balanced ball valve arranged in unseating relation with said valve seats, opposed yielding means for supporting the ball valve in its normal position, said opposed yielding means and said ball valve being responsive to variable pressures in said fluid outlets for moving the ball valve into seating relation with the valve seat associated with the low pressure fluid outlet, said opposed yielding means being so arranged as to respectively hold the ball valve against either seat when seated thereon.

8. In a hydraulically operated braking system of the type wherein liquid lines connect a master cylinder with a plurality of braking cylinders, a valve unit having a brake fluid inlet connection with the master cylinder and individual brake fluid outlets communicating with said lines, a partition in the valve unit having a bore communicating with the fluid outlets, valve seats associated with the fluid outlets, a ball valve normally balanced in said bore, and opposed springs for supporting the ball valve in its normal position, said opposed springs and said ball valve being responsive to variable pressures on opposite sides of the partition for moving the ball valve into seating relation with the valve seat associated with the low pressure fluid outlet, said opposed springs being so arranged that one spring will hold the ball valve against one seat when seated thereon and the other spring will hold the valve against the other seat when seated thereon.

9. In a hydraulically operated braking system of the type described wherein liquid lines connect a master cylinder with a plurality of brake cylinders, a valve unit having a brake fluid inlet connection with the master cylinder and individual brake fluid outlets communicating with said lines, a partition in the valve unit having a bore communicating with the outlets, valve seats associated with the fluid outlets below said bore, a ball normally balanced in said bore, and resilient means for supporting the ball valve in its normal position, said resilient means and said ball valve being responsive to variable pressures on opposite sides of the partition for moving the ball valve from said bore and dropping the ball valve onto the valve seat associated with the low pressure fluid outlet, said outlets being of larger volumetric capacity than the adjacent fluid inlet to accelerate pressure reduction on the lower pressure fluid outlet.

RUDOLPH H. BLANK.